July 29, 1969  I. K. L. ANDREN  3,457,604
CLAMP
Filed Sept. 29, 1967  3 Sheets-Sheet 1
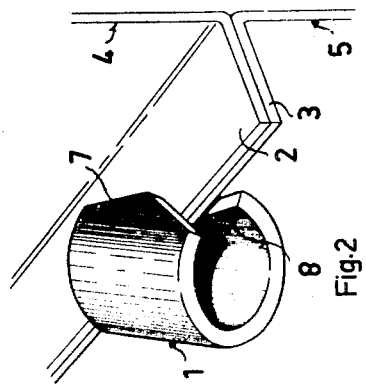
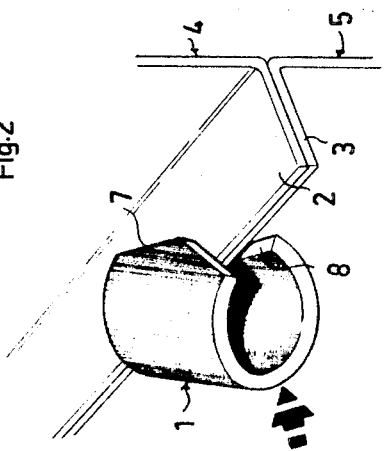
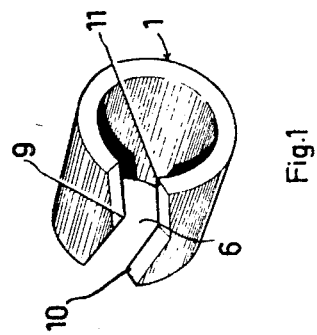
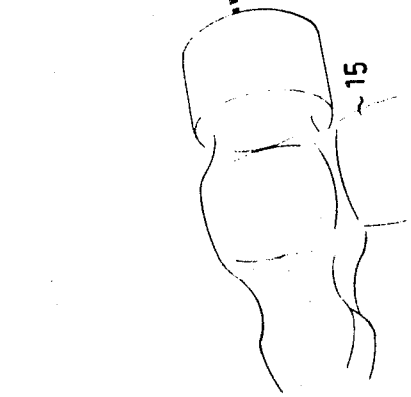
INVENTOR:
INGMAR KARL LINUS ANDREN
by
Browne, Schuyler + Beveridge
Attorneys July 29, 1969  I. K. L. ANDREN  3,457,604
CLAMP
Filed Sept. 29, 1967  3 Sheets-Sheet 2
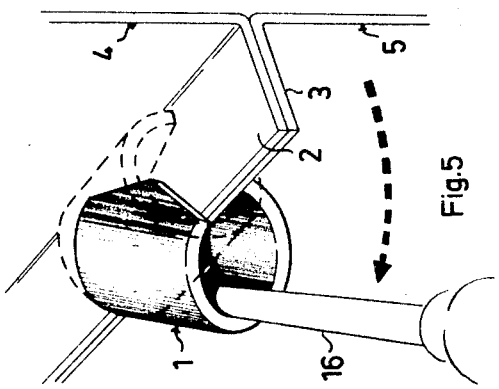
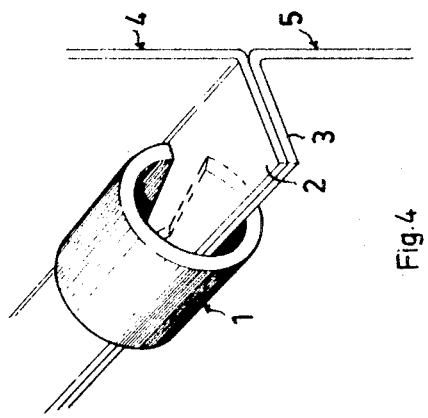
INVENTOR:
INGMAR KARL LINUS ANDREN July 29, 1969    I. K. L. ANDREN    3,457,604
CLAMP
Filed Sept. 29, 1967    3 Sheets-Sheet 3
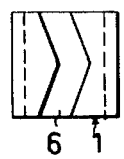
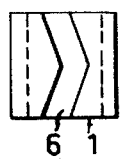
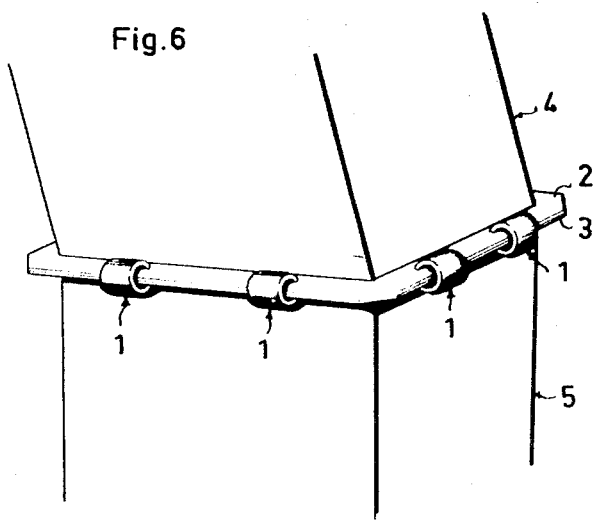
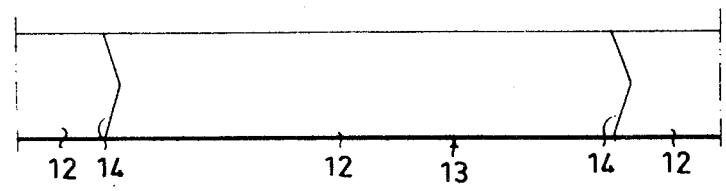
INVENTOR:
INGMAR KARL LINUS ANDREN
by
Browne, Schuyler + Beveridge
Attorneys

United States Patent Office 3,457,604
Patented July 29, 1969

3,457,604
CLAMP
Ingmar Karl Linus Andren, Lindesberg, Sweden, assignor to Aktiebolaget Linde Maskiner, Lindesberg, Sweden
Filed Sept. 29, 1967, Ser. No. 671,812
Claims priority, application Sweden, Oct. 4, 1966, 13,362/66
Int. Cl. F16b 2/24
U.S. Cl. 24—255                                   5 Claims

ABSTRACT OF THE DISCLOSURE

A clamp in the form of an open ring having a convex end portion and a concave end portion which are so conformed to each other that the distance between them is substantially constant throughout the width of the ring, whereby the ring end portions will have a firm grip about the flanges of sheet metal components to be connected together by means of the clamp.

---

The customary way of assembling flanged sheet metal components is to use screws or rivets. In series production, drilling fixtures will have to be used for drilling the holes. This procedure involves high costs, and what is more it may still be difficult to realize the desired exact fit.

This invention eliminates the abovementioned disadvantages. The invention thus relates to a clamp for assembling flanged sheet metal components, and the clamp consists of an open ring of resilient plate material, said ring being adapted, for the assembly of said components, to grip the flanges thereof so that the ring end portions which define said opening engage the flanges under pressure due to the spring action of the plate material. The invention is substantially characterized in that one end portion is convex and the other end portion is concave and that both end portions are so conformed to each other that the distance between them is substantially constant throughout the width of the ring.

The invention which is also directed to a method for making the clamp will become more fully apparent from the following specification reference being made to the accompanying drawings which illustrate some embodiments, chosen by way of example, of the clamp. In the drawings:

FIGURE 1 shows a perspective view of the clamp in one embodiment thereof;

FIGURES 2–5 also show perspective views of the same clamp which is shown coacting with the flanges of a pair of sheet metal components, FIGURES 2 and 3 illustrating the clamp during mounting, FIGURE 4 illustrating the clamp in its mounted state, and FIGURE 5 illustrating how to effect dismounting of the clamp;

FIGURE 6 on a smaller scale and in perspective view shows the two sheet metal components in the form of conduits joined together by several clamps;

FIGURES 7–10 show side views of four different embodiments of the clamp according to the invention;

FIGURE 11 shows a band from which the clamp is intended to be made.

The clamp consists of an open ring 1 of resilient plate material, said ring being adapted to grip the flanges 2 and 3 of the sheet metal components 4 and 5 to be assembled. The ring end portions 7 and 8 defining the opening 6 shall engage the flanges 2 and 3 under pressure due to the spring action of the material.

It is essential to the invention that one end portion 7 is convex and the other end portion 8 is concave and that the two end portions 7 and 8 are so conformed to each other that the distance between them is fundamentally constant throughout the width of the ring. In the preferred embodiments illustrated the convex end portion 7 has its highest point 9 and the concave end portion 8 its lowermost point in the middle plane of the ring 1.

As will appear from the drawings the convex and concave end portions 7 and 8 are angular so that the corners 10 and 11 of the concave end portion 8 will have a firm grip about the flange 3. By reason of its shape the highest point 9 of the end portion will also have a firm grip about the flange 2. In a modified embodiment, the end portions 7 and 8 may be arcuate and of a curvature closely conforming to the angular shape, the engagement being fundamentally the same.

All clamps shown in FIGURES 7–10 are made from ⅛″ x ¾″ spring steel, the outer diameter of the clamps being 20 mm. The grooves constituting the opening 6 are 4 mm. wide in the embodiments according to FIGURES 7 and 8, and 5 mm. wide in the embodiments according to FIGURES 9 and 10. The top and bottom angle, respectively, of the end portions 7 and 8, respectively, is 140° in the embodiments according to FIGURES 7 and 9, and 136° in the embodiments according to FIGURES 8 and 10. However, the angle can be modified somewhat without jeopardizing the joining effect. The size of the clamps may of course be varied within broad limits with due consideration of the use.

FIGURE 11 intends to illustrate that the blanks 12 for the clamps according to the invention can be cut from a band 13 of spring steel, each cut 14 forming the convex end portion of a clamp and the concave portion of another clamp. The blanks 12 are then, or already in conjunction with the cutting, formed into the open rings 1 and hardened.

At the mounting the clamp is first pushed with one side over the flanges 2 and 3 as shown in FIGURE 2 whereupon the clamp is hit into the desired position by means of a hammer or like impact tool 15, as FIGURE 3 is intended to illustrate. FIGURE 4 shows the clamp in mounted position from which it can be removed with the aid of a chisel 16 or like tool, in the way illustrated in FIGURE 5.

What I claim and desire to secure by Letters Patent is:

1. A clamp for assembling flanged sheet metal components, said clamp consisting of an open ring of resilient plate material, said ring being adapted for the assembly of said components, to grip the flanges thereof so that the ring end portions which define said opening engage the flanges under pressure due to the spring action of the plate material, wherein one end portion is convex and the other end portion is concave and both end portions are so conformed to each other that the distance between them is substantially constant throughout the width of the ring.

2. A clamp in accordance with claim 1, wherein the convex end portion has its highest point and the concave end portion has its lowermost point in the middle plane of the ring.

3. A clamp in accordance with claim 2, wherein the convex and concave end portions are angular.

4. A clamp in accordance with claim 3, wherein the angular end portions have a top and bottom angle, respectively, of about 135–140°.

5. A clamp in accordance with claim 2, wherein the convex and concave end portions are arcuate.

References Cited

UNITED STATES PATENTS

| 750,999 | 2/1904 | Ohnstrand | 52—584 XR |
| 1,612,635 | 12/1926 | Hart. | |
| 2,639,691 | 5/1953 | Zurlo. | |

FOREIGN PATENTS 242,185  11/1925  Great Britain.

DONALD A. GRIFFIN, Primary Examiner

U.S. Cl. X.R.

52—584